United States Patent Office 3,410,862
Patented Nov. 12, 1968

3,410,862
PYRIDOXINE SYNTHESIS
Janos Kollonitsch, Westfield, N.J., assignor to Merck & Co., Inc., Rahway, N.J., a corporation of New Jersey
No Drawing. Filed Oct. 6, 1965, Ser. No. 493,557
3 Claims. (Cl. 260—297.5)

ABSTRACT OF THE DISCLOSURE

Esters or the anhydride of 2-methyl-3-hydroxy-4,5-bis(carboxy)pyridine are reduced to pyridoxine (vitamin $B_6$) by reaction with an alkaline earth borohydride in tetrahydrofuran.

---

This invention relates to an improved process for the preparation of pyridoxine (Vitamin $B_6$). More particularly, it relates to an improved process for the preparation of pyridoxine by the reduction of esters of 2-methyl-3-hydroxy-4,5-bis(carboxy)pyridine or the anhydride thereof.

The reduction of 4,5-bis(carboxy)pyridine esters to the corresponding 4,5-bis(hydroxymethyl)pyridines by several methods has been described in the art. However, these described procedures are generally unsatisfactory for use on a commercial scale, since they involve the use of expensive and/or potentially hazardous solvents and reactants. Thus, known processes for the reduction of esters of ichiba acid, 2-methyl-3-hydroxy-4,5-bis(carboxy)pyridine, to pyridoxine suffer from these disadvantages, and therefore a process more suitable for reducing such esters on a commercial scale has been sought.

It is an object of this invention to provide an improved method for the preparation of pyridoxine from esters of ichiba acid or its anhydride. A further object is to provide an improved process for the reduction of esters of ichiba acid or its anhydride which is economical and suitable for use on a commercial scale. Other objects of the invention will be apparent from the detailed description of this invention hereinafter provided.

In accordance with this invention, it is now found that esters of ichiba acid or its anhydride can be reduced to pyridoxine by reaction with alkaline earth metal borohydrides in a tetrahydrofuran medium. When the reduction of the ichiba acid derivatives is carried out in accordance with this invention, I find that yields of pyridoxine in excess of about 80% of the theoretical can be readily obtained using only 1 mole equivalent of the alkaline earth metal borohydride per mole of ichiba acid derivative being reduced. Thus, I have obtained yields of 80% or more of pyridoxine by intimately contacting the diethyl ester of ichiba acid with 1 mole equivalent of calcium borohydride in a tetrahydrofuran medium. The reaction is conveniently effected by adding a tetrahydrofuran solution of the ichiba acid ester or anhydride to a tetrahydrofuran solution of the alkaline earth metal borohydride and then heating the resulting reaction mixture in a sealed vessel at a temperature within the range of about 65–150° C. for sufficient time to complete the reduction. The time required for carrying out this reaction will depend upon the temperature, longer times being required at the lower temperatures and shorter times at the higher temperatures. Thus, for example, when carrying out the reduction at the preferred temperature range of about 80–130° C., the reaction is complete in about 5–15 hours.

After completion of the reaction, the borates produced as by-products during the process are removed and the pyridoxine recovered in accordance with procedures known in the art. Thus, the borates are readily removed by esterifying with a lower alkanol, such as methanol or ethanol, and then distilling off the borate esters so formed. The desired pyridoxine can be then conveniently recovered from the resulting solution.

Although any ester of ichiba acid can be reduced in accordance with the process of this invention, it is preferred to use a lower alkyl ester, such as the ethyl, propyl, butyl, or amyl ester, since under optimum conditions maximum yields of the desired pyridoxine are obtained using these particular esters of ichiba acid.

The following examples illustrate methods of carrying out the improved process of this invention. They are intended to be illustrations of the invention and not limitations thereof.

EXAMPLE 1

Reduction of 2-methyl-3-hydroxy-4,5-bis(carbethoxy)pyridine to produce pyridoxine A solution of 7.35 grams of 2-methyl-3-hydroxy-4,5-bis(carbethoxy)pyridine in 16 ml. of tetrahydrofuran is slowly added to the calcium borohydride solution prepared as described below over a period of about 10 minutes. The mixture is then stirred at 130° C. for 10 hours in a sealed autoclave. To the reaction mixture which is now a light yellow clear solution containing a fine yellow powder sediment is then added slowly 40 ml. of 2.5 N hydrochloric acid under ice cooling. The reaction mixture is heated at 60° C. to 65° C. for approximately one hour. The resulting light-colored solution is then evaporated to dryness and 50 ml. of methanol added, followed by the addition of 100 ml. of methanolic hydrogen chloride. The methyl borate formed is distilled off at atmospheric pressure. The distillation of the methyl borate is continued until no crystalline residue of boric acid remains after the evaporation of a sample of the distillate to which is added a small amount of water to hydrolyze the methyl borate.

The borate-free methanolic solution is then concentrated under reduced pressure to yield a colorless, crystalline product which is then slurried with methanol and filtered to yield 7.86 grams of a solid containing vitamin $B_6$ hydrochloride. This product corresponds to a 71% yield of pure vitamin $B_6$ hydrochloride according to a paper chromatographic assay of its purity. The filtrate contains an additional 10.5% of vitamin $B_6$ hydrochloride as shown by a paper chromatographic assay, thus raising the total yield to 81.5% of theory.

In another experiment, the calcium borohydride solution prepared as described below is freed of sodium chloride by centrifugation and the calcium borohydride solution then used as described above. This particular experiment results in a 77% yield of pyridoxine hydrochloride as determined by U.V. and spectroscopic analysis while the mother liquor contains an additional 7% of pyridoxine hydrochloride to raise the total yield to approximately 84% of theory.

Preparation of calcium borohydride in tetrahydrofuran 2.33 grams of sodium borohydride (94.0% pure) and 3.68 grams of calcium chloride are stirred in 80 ml. of tetrahydrofuran for approximately 14 hours in a 300 ml., magnetically-stirred autoclave which is later used in the reduction part of the process of this invention as described above. The resulting colorless solution of calcium borohydride containing a sediment of sodium chloride is used in the reduction described above without separating the sodium chloride from the solution. Alternatively, the tetrahydrofuran solution of calcium borohydride containing a sediment of sodium chloride can be freed of the sodium chloride by filtration or centrifugation and the filtrate used in the reduction described above.

EXAMPLE 2

Following the procedure of Example 1 [reduction of 2-methyl-3-hydroxy-4,5-bis(carbethoxy)pyridine to pyridoxine] but substituting magnesium borohydride, strontium borohydride or barium borohydride in place of the calcium borohydride there is produced pyridoxine hydrochloride. The tetrahydrofuran solutions of magnesium borohydride, strontium borohydride or barium borohydride are prepared according to the procedure set forth in Example 1 by using an equivalent amount of magnesium chloride, strontium chloride or barium chloride in the place of the calcium chloride.

EXAMPLE 3

When the procedure of Example 1 is followed using an equivalent amount of 2-methyl-3-hydroxy-4,5-bis(carbomethoxy)pyridine, 2-methyl-3-hydroxy-4,5-bis(carbopropoxy)pyridine, or the anhydride of 2-methyl-3-hydroxy-4,5-bis(carboxy)pyridine in place of the 2-methyl-3-hydroxy-4,5-bis(carbethoxy)pyridine, pyridoxine hydrochloride is obtained.

What is claimed is:

1. A process for the preparation of pyridoxine which comprises intimately contacting 2-methyl-3-hydroxy-4,5-bis(carboloweralkoxy)pyridine or the anhydride of 2-methyl-3-hydroxy-4,5-bis(carboxy)pyridine with an alkaline earth borohydride in tetrahydrofuran at a temperature from 65° C. to 150° C.

2. A process for the preparation of pyridoxine which comprises intimately contacting 2-methyl-3-hydroxy-4,5-bis(carbethoxy)pyridine with calcium borohydride in tetrahydrofuran at a temperature between 80° C. and 130° C.

3. A process for the preparation of pyridoxine which comprises intimately contacting the anhydride of 2-methyl-3-hydroxy-4,5-bis(carboxy)pyridine with calcium borohydride in tetrahydrofuran at a temperature of between 80° C. and 130° C.

References Cited

UNITED STATES PATENTS 2,744,114   5/1956   Jones _____ 260—297.5

OTHER REFERENCES

Gaylord, Reduction With Complex Metal Hydrides, Interscience, (1956), pp. 379 QD 63. R4 G3.

HENRY R. JILES, *Primary Examiner.*

A. L. ROTMAN, *Assistant Examiner.*